United States Patent
Stein (10) Patent No.: US 10,999,207 B2
(45) Date of Patent: May 4, 2021

(54) PACKET LOSS REDUCTION USING AUXILIARY PATH

(71) Applicant: RAD DATA COMMUNICATIONS LTD., Tel Aviv (IL)

(72) Inventor: Yaakov Stein, Jerusalem (IL)

(73) Assignee: RAD DATA COMMUNICATIONS LTD., Tel Aviv (IL)

( * ) Notice: Subject to any disclaimer, the term of this patent is extended or adjusted under 35 U.S.C. 154(b) by 2 days.

(21) Appl. No.: 16/412,461

(22) Filed: May 15, 2019

(65) Prior Publication Data

US 2020/0366620 A1    Nov. 19, 2020

(51) Int. Cl.
| | |
|---|---|
| *H04W 48/18* | (2009.01) |
| *H04L 12/801* | (2013.01) |
| *H04L 12/725* | (2013.01) |
| *H04L 12/851* | (2013.01) |
| *H04W 28/02* | (2009.01) |

(52) U.S. Cl.
CPC ............ *H04L 47/34* (2013.01); *H04L 45/302* (2013.01); *H04L 47/2408* (2013.01); *H04W 28/0236* (2013.01)

(58) Field of Classification Search
None
See application file for complete search history.

(56) References Cited

U.S. PATENT DOCUMENTS

| | | | |
|---|---|---|---|
| 5,883,891 A | 3/1999 | Williams et al. | |
| 7,032,028 B2 | 4/2006 | Clay et al. | |
| 9,584,337 B2 | 2/2017 | Kadel et al. | |
| 10,015,096 B1 | 7/2018 | Singh | |
| 2006/0013210 A1 | 1/2006 | Bordogna et al. | |
| 2010/0251067 A1* | 9/2010 | Hughes | H04N 21/8166 714/755 |
| 2011/0228794 A1* | 9/2011 | Yong | H04L 1/1809 370/412 |

(Continued)

OTHER PUBLICATIONS

RFC 6363 Forward Error Correction (FEC) Framework ; URL: https://datatracker.ietf.org/doc/rfc6363/.

(Continued)

*Primary Examiner* — Brandon M Renner
(74) *Attorney, Agent, or Firm* — A.C. Entis-IP Ltd.; Allan C. Entis; Kenichi N. Hartman (57) ABSTRACT

A method for an ingress node to send packets to an egress node, the method comprising: sending a plurality of service packets over a first network path; and sending a supplemental packet comprising a plurality of hash values over a second network path, wherein the plurality of packet hash values are computed respectively from the plurality of service packets. A method for an egress node to receive packets from an ingress node, the method comprising: extracting a plurality of packet hashes from a supplemental packet received from a second network path; computing a plurality of packet hash values, each hash value computed from a corresponding service packet comprised in a plurality of service packets received over a first network path; and recovering a lost service packet that is identified by comparing the plurality of computed packet hash values with the plurality of extracted packet hash values.

20 Claims, 6 Drawing Sheets

(56) References Cited

U.S. PATENT DOCUMENTS

| | | | | |
|---|---|---|---|---|
| 2014/0029701 A1* | 1/2014 | Newham | ............... | H04J 3/0652 |
| | | | | 375/340 |
| 2015/0189229 A1* | 7/2015 | Cserna | ................... | H04N 7/148 |
| | | | | 348/14.02 |
| 2016/0028630 A1* | 1/2016 | Wells | .................. | H04L 45/7453 |
| | | | | 370/389 |
| 2017/0294991 A1* | 10/2017 | Vincent | ................. | G06F 11/079 |
| 2019/0238459 A1* | 8/2019 | Shmilovici | ......... | H04L 45/7453 |
| 2019/0386913 A1* | 12/2019 | Wei | ......................... | H04L 45/38 |

OTHER PUBLICATIONS

ONUG Software-Defined WAN Use Case, A White Paper from the ONUG SD-WAN Working Group, Oct. 2014, 10pgs; URL: https://www.onug.net/app/uploads/2018/03/ONUG-SD-WAN-WG-Whitepaper_Final1-1.pdf.

MEF Understanding SD-WAN Managed Services, Service Components, MEF LSO Reference Architecture and Use Cases, 15 pgs., Jul. 2017; URL: http://www.mef.net/resources/download?id=45&fileid=file1.

European Search Report dated Jul. 15, 2020 for Application No. 20174806.8, Filed May 15, 2020.

\* cited by examiner

PACKET LOSS REDUCTION USING AUXILIARY PATH

FIELD

The present disclosure relates to methods that compensate for packet loss in network communications. More specifically, methods to reduce the packet loss ratio of an inexpensive high data rate, best effort service by supplementing it with low data rate, carrier grade service.

BACKGROUND

Packets can be transmitted between nodes connected by packet switched communications networks with differing levels of cost and performance. Pricing of network services with strong Quality of Service (QoS) guarantees is typically higher than those with few or no such guarantees. In effect, end-users pay a premium for "Carrier-Grade" (CG) services (such as business Virtual Private Network service) having QoS guarantees, while Best Effort (BE) services having few or no QoS guarantees may be free (as in the case of free public WiFi access) or minimally priced (as in residential Internet access).

Packets in a BE service may be lost between source and destination (for example, due to buffer overflow or deliberate discarding), so that Packet Loss Ratios (PLRs) of the order of 1% for BE services are not uncommon. Packets in a BE service may also experience large end-to-end data transmission latencies (generally due to waiting in router queues), so that end-to-end latencies for BE services may be twice as long as a theoretical minimal latency based solely on the physical constraints of a network (or networks) serving a given BE service.

In contrast, packets in a CG service experience low PLRs (by way of example on the order of 1 packet per million) and low end-to-end latency, by way of example, within 15% of the minimal physically possible latency. However, CG services are priced substantially higher than BE services, perhaps 5 to 10 times higher.

SUMMARY

The present disclosure provides embodiments for a PLR reduction method, which achieves low PLR despite sending service packets from a source to a destination over a low QoS network path, optionally without requiring modification or replication of the service packets. The PLR reduction is achieved by additionally sending, over a high QoS network path, supplemental information that is computed from the service packets at the source, and is utilized at the destination to recover packets lost by the low QoS network path.

As used herein, the terms "low" and "high" used to qualify a QoS path is understood to be relative qualifiers, meaning that the low-QoS channel is characterized by a low QoS relative to the high-QoS channel and the high-QoS channel is characterized by a high QoS relative to the low-QoS channel. By way of example, inexpensive BE services provide low-QoS paths, while expensive CG services deliver high-QoS paths.

In an embodiment of the disclosure, a PLR reduction method entails two Performance Improvement Endpoints (PIEs) situated at respective ends of an end-to-end data service. These PIEs are interconnected via a primary path, and at least one supplemental path. It is assumed the primary path is an inexpensive high data-rate but high PLR and high delay path. In an embodiment of the disclosure, it is advantageous for the supplemental path(s) to be of higher QoS, in particular of lower delay, than the primary path.

For convenience of presentation, a PIE that operates to transmit packets to another PIE may be referred to herein as an "ingress PIE", and a PIE that operates to receive packets transmitted from an ingress PIE may be referred to herein as an "egress PIE". For convenience of presentation, a PLR reduction method as executed by a PIE operating as an ingress PIE may be referred to herein as an "ingress PLR reduction method", and a PLR reduction method as executed by a PIE operating as an egress PIE may be referred to herein as an "egress PLR reduction method".

It will be understood that, in accordance with an embodiment of the disclosure, each PIE may be operable to both transmit and receive packets to perform bidirectional communication with other PIEs, so that each PIE is operable to function as both an ingress PIE for packets flowing in one direction, and an egress PIE for packets flowing in the opposite direction. A plurality of PIEs in accordance with an embodiment of the disclosure operable to both transmit and receive packets to perform bidirectional communication with other PIEs may be referred to herein as a "PLR reduction system".

In an embodiment of the disclosure, the ingress PIE performs the following actions comprised in an ingress PLR reduction method: obtaining packets to be delivered by the end-to-end service from a source end-user; forwarding the packets over the primary path; temporarily storing the packets in a memory; generating a supplemental Packet Loss Detection (PLD) packet based on the temporarily stored packets; and sending the PLD packet over the supplemental path.

In an embodiment of the disclosure, the egress PIE performs the following actions comprised in an egress PLR reduction method: receiving packets sent over the primary path from an ingress PIE; receiving a PLD packet sent over the supplemental path from the ingress PIE; detecting an absence of a lost packet that was lost during traversal of the primary path from the ingress PIE, based on comparing the received packets with supplemental information comprised in the PLD packet; forwarding the packets to a destination end-user.

The supplemental information optionally comprises a list of hash values identifying packets forwarded from the ingress PIE to the egress PIE, optionally since the last PLD packet was sent. A hash value for a packet is an identifier that with high probability uniquely identifies that packet. Optionally, the supplemental information further comprises one or more of the following: packet lengths, values of packet headers fields, and FLR information. In an embodiment of the disclosure, the egress PIE, upon detecting the absence of the lost packet, transmits a retransmission requests to the ingress PIE, the retransmission request comprising instructions for the ingress PIE to retransmit the lost packet. Optionally, the retransmission request is sent over the supplemental path or the primary path. Optionally, the retransmission of the lost packet is sent over the supplemental path or the primary path.

If the supplemental path is of lower delay than the primary path, the retransmission request and the packet retransmissions may be sent over the supplemental path in order to minimize delay. In such a case, the egress PIE optionally forwards service packets successfully received unpostponed, resulting in packet misordering to be handled by the destination end-user. Alternatively, the egress PIE temporarily store packets successfully received that were sent after a lost packet, and release them in the order by which the service packets were originally transmitted by the ingress PIE.

In a case where the PLD packet comprises the FLR information, the egress PIE upon detection of an absence of a lost packet optionally generates the lost packet based on the FLR information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1:
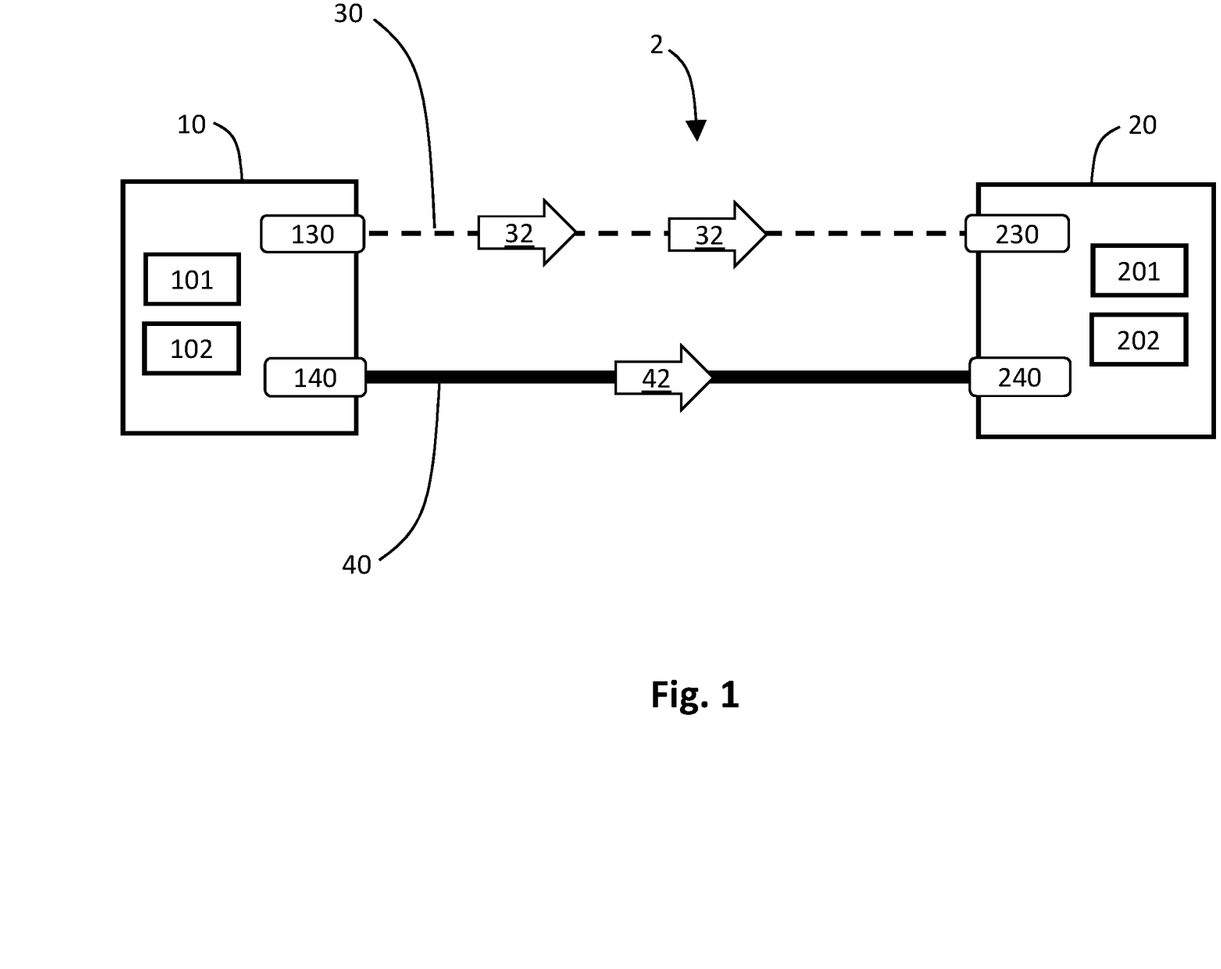
FIG. 1 schematically shows a PLR reduction system comprising a pair of PIEs providing an end-to-end service in accordance with an embodiment of the disclosure.

Reference is made to FIG. 1 schematically showing a PLR reduction system 2 comprising a PIE 10 and a PIE 20, which are operable to establish an end-to-end packet delivery service, and are interconnected via network paths 30 and 40. Network path 30, schematically indicated by a dotted line, is an inexpensive BE path, and is characterized by a relatively low QoS, a relatively high PLR, a relatively high propagation delay, and weak or nonexistent information rate commitments. Network path 40, schematically indicated by a solid line, is an expensive CG path, and is characterized by a relatively high QoS, a relatively low PLR, a relatively low propagation delay, and a relatively strongly guaranteed Committed Information Rate (CIR). For convenience of presentation, network path 30 may be referred to hereinbelow as a "low QoS path" and network path 40 may be referred to hereinbelow as a "high QoS path".

In accordance with an embodiment of the disclosure, PIE 10 comprises a processor 101, a memory 102, a port 130 operable to transmit data packets via low QoS path 30, and a port 140 operable to transmit data packets via high QoS path 40.

In accordance with an embodiment of the disclosure, PIE 20 comprises a processor 201, a memory 202, a port 230 operable to receive data packets via BE path 30, and a port 240 operable to receive data packets via high QoS path 40.

For the purposes of the present example, the nomenclature of "ingress PIE" is used to refer to PIE 10 that is operating to forward data packets from a source end-user (not shown) over network path 30 to PIE 20, and to use the nomenclature of "egress PIE" to refer to PIE 20 that is operating to receive data packets from ingress PIE 10 and forward them to a destination end-user (not shown). FIG. 1 schematically shows ingress PIE 10 sending a packet, which is schematically indicated as block arrow 32 pointed towards egress PIE 20, via BE path 30. FIG. 1 also schematically shows ingress PIE 10 sending a supplemental PLD packet, which is schematically indicated as block arrow 42 pointed towards its destination of egress PIE 20, via high QoS path 40. However, it will be understood that, in accordance with an embodiment of the disclosure, each PIE may be operable to both transmit and receive packets to perform bidirectional communication with other PIEs, so that each PIE is operable to function as both an ingress PIE for packets flowing in one direction, and an egress PIE for packets flowing in the opposite direction.

In an embodiment of the disclosure, an ingress PLR reduction executed by ingress PIE 10 comprises: sending a plurality of service packets over a first network path, by way of example BE path 30; and sending a supplemental packet comprising a plurality of hash values over a second network path, by way of example high QoS path 40, wherein the plurality of packet hash values are computed respectively from the plurality of service packets. In an embodiment of the disclosure, an egress PLR reduction executed by egress PIE 20 comprises: extracting a plurality of packet hashes from a supplemental packet received from a second network path, by way of example high QoS path 40; computing a plurality of packet hash values, each hash value computed from a corresponding service packet comprised in a plurality of service packets received over a first network path, by way of example BE path 30; and recovering a lost service packet that is identified by comparing the plurality of computed packet hash values with the plurality of extracted packet hash values.

Figure 2:
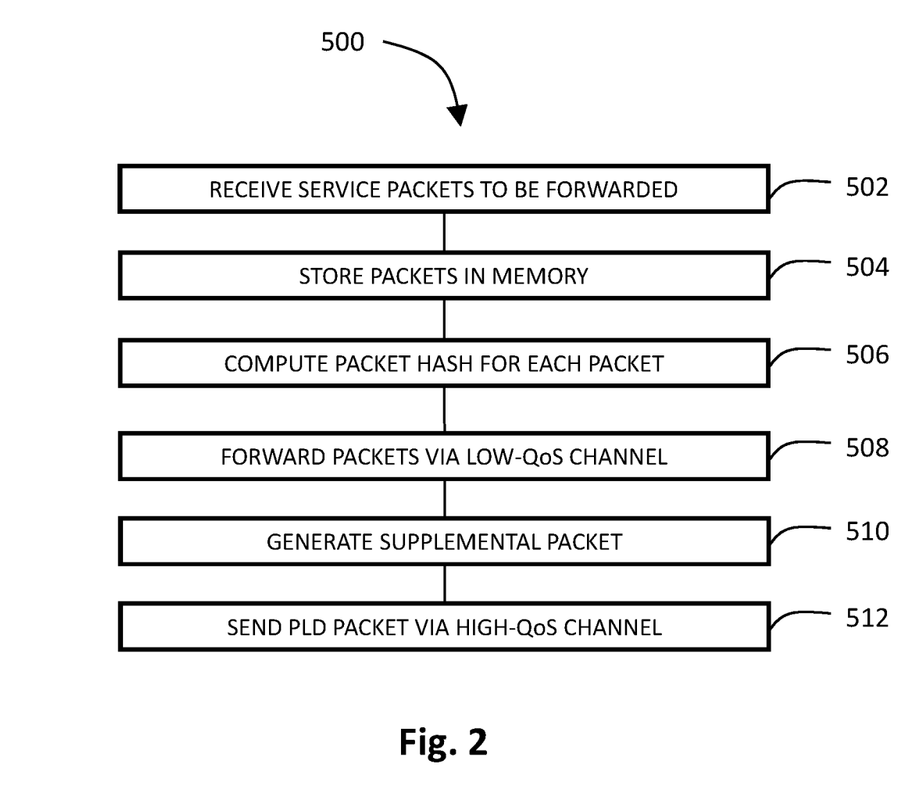
FIG. 2 shows a flow diagram of an ingress PLR reduction method as performed by an ingress PIE in accordance with an embodiment of the disclosure.

FIG. 2 depicts a flow diagram of an ingress PLR reduction method 500 as performed by ingress PIE 10, in accordance with an embodiment of the disclosure. Optionally, PIE 10 is operable to perform this PLR reduction method as controlled by a set of instructions stored in memory 104 and executed by processor 102.

In a block 502, ingress PIE 10 receives a set of service packets to forward to the destination. In a block 504, PIE 10 temporarily stores the service packets in memory 102 and, in a block 506, CPU 101 computes a set of hash values, one for each packet. Each hash value as computed in block 506, uniquely identifies its corresponding packet with high probability, and a given hash value corresponding to a given packet may be referred to herein as a "packet hash". A packet hash may be computed by a mathematical function (a "hash function") of all or any subset of the bytes comprising the corresponding service packet. Optionally, the hash function further includes packet meta-data (such as packet length) of a packet to compute the corresponding packet hash. In a block 508, PIE 10 forwards the service packets over BE path 30 towards egress PIE 20. In a block 510, ingress PIE 10 generates a supplemental Packet Loss Detection (PLD) packet comprising the set of packet hashes determined in block 506, and in block 512, ingress PIE 10 transmits supplemental PLD packet 42 to egress PIE 20 via CG path 40.

Optionally, ingress PIE 10 is configured to generate a new PLD packet 42 periodically every T seconds. Shorter time duration T results in higher cost due to increased traffic over the more expensive network path 40, but advantageously results in lower added delay. Optionally, ingress PIE 10 is configured to generate a new PLD packet 42 periodically every N service packets or every B service bytes. In such cases, to protect against excessive delay, ingress PEI 10 is optionally configured to generate a new PLD packet 42 before the number of service packets reaches N or the amount of services bytes reaches B, provided that a maximum time threshold $T_{max}$ following generation of the previous PLD packet is reached. In some embodiments, the rate at which supplemental PLD packet 42 is generated generation by egress PIE 10 is determined based on one or more of the following factors: 1) application type supported by the low QoS path; 2) propagation latency of the low QoS path, and 3) CIR of the high QoS path.

With reference to block 510 of PLR reduction method 500, PLD packet 42, in accordance with an embodiment of the disclosure, comprises a set of packet hashes that comprise information enabling egress PIE 20 to identify packets that are expected to be received from PIE 10 and determine if any packets forwarded by PIE 10 in block 502 were lost in transit but does not comprise sufficient information for PIE 20 to restore the lost service packet without requesting for and receiving further data from PIE 10. A hash function that generates a packet in accordance with an embodiment of the disclosure is configured so that a small modification to a portion of the packet used by the hash function to compute the packet hash results in a large change in the value of the packet hash. Therefore, in an embodiment of the disclosure, even if a given service packet is sent from ingress PIE 10 and successfully received by egress PIE 20, small changes in the service packet, even of a single bit within portion of the service packet that is used to calculate the packet hash may be manifested as a large change in the value of the corresponding packet hash.

Optionally, service packets 32 contain sequence numbers. This may be the case for Real Time Protocol (RTP) packets, for Multiprotocol Label Switching (MPLS) pseudowire packets, for Generic Routing Encapsulation (GRE) packets, and for other protocols that need to guarantee loss detection and/or in-order delivery. Optionally, ingress PIE 10 adds a sequence number to the packet as part of its tunneling protocol (e.g., to securely traverse Internet connections). For service packets containing sequence numbers, the packet hash may comprise the sequence number that uniquely identifies the packet.

Typically, a set of packet hashes does not comprise sufficient information for PIE 20 to restore the lost service packet without receiving further data from ingress PIE 10. In some embodiments of the disclosure supplemental PLD packet 42 comprises additional information sufficient to enable recovery of a lost service packet or packet by egress PIE 20, without need for retransmission of the lost service packet. Tue additional information comprised in the PLD packet may be referred to herein as Forward Loss Recovery (FLR) information, which is comprised in an FLR field that is optionally comprised in PLD packet 42. Optionally, the FLR field comprises packet lengths and a Forward Error Correction (FEC) erasure code field. Optionally, the FEC erasure code field comprises an exclusive or (xor) of all service packets sent from ingress PIE 10 during a given session, which information may be used by egress PIE 20 to recover a single lost packet. Optionally, the FLR field is characterized by a field length equal to the length of a longest allowed service packet, with shorter service packets being padded to the longest allowed length for the purposes of the xor operation. Optionally, the FLR field is of length equal to the length of a longest service packet being protected, and shorter service packets are padded to this length for the purposes of the xor operation. Optionally, the FEC erasure code field comprises any of the erasure codes well known in the art, such as fountain codes, which information may be used by egress PIE 20 to recover one or more lost packets.

It will be appreciated that, in cases where PLD packet 42 comprises a FEC erasure code field, the frequency of generating and sending PLD packets affects the probability of recovery, due to FEC erasure codes being limited by a maximum number of packets that may be recovered using said FEC erasure codes.

In an embodiment of the disclosure, packet hashes comprised in a supplemental PLD packet 42 from ingress PIE 10 can be used by egress PIE 20 to detect and/or recover a lost service packet. In an embodiment of the disclosure, a PLR reduction method further comprises egress PIE 20 performing a procedure to detect and/or recover a lost service packet responsive to a set of service packets and a supplemental PLD packet 42 received from ingress PIE 10.

Figure 3A:
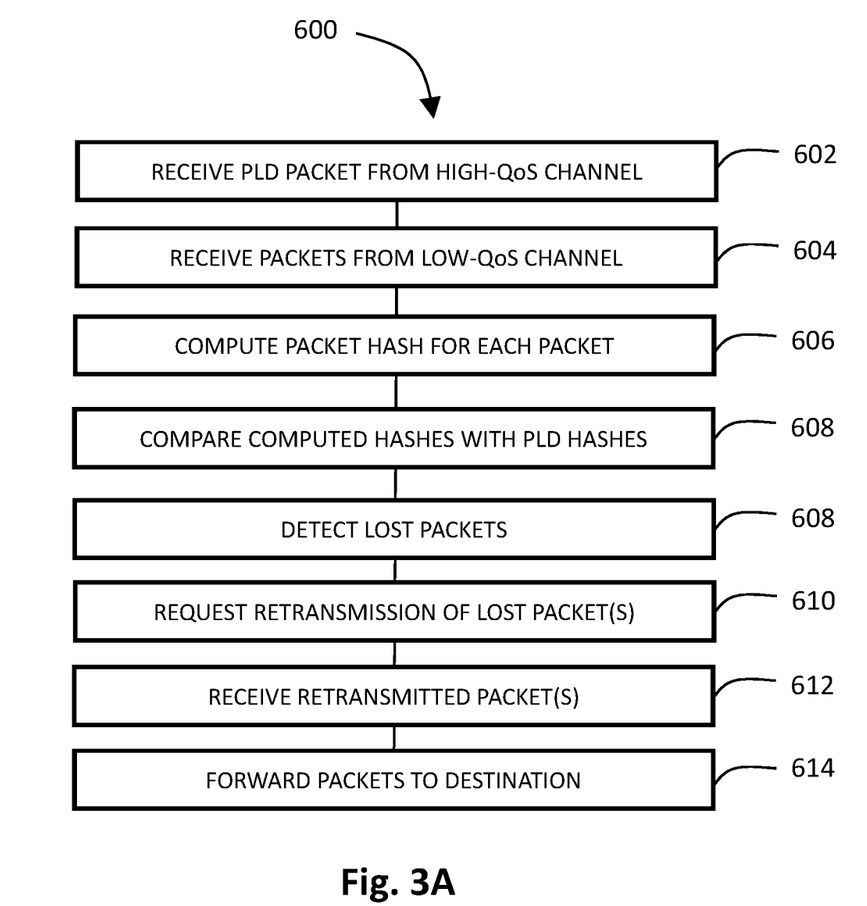
FIG. 3A shows a flow diagram of an egress PLR reduction method as performed by an egress PIE in accordance with an embodiment of the disclosure.

FIG. 3A depicts a flow diagram 600 of an egress PLR reduction method as performed by egress PIE 20, in accordance with an embodiment of the disclosure. Optionally, PIE 20 is operable to perform PLR reduction method 600 as controlled by a set of instructions stored in memory 202 and executed by processor 201. As noted above, a given PIE can serve as both an ingress PIE and an egress PIE. Therefore, a given PIE is optionally operable to perform both PLR reduction method 500 as shown in FIG. 2 as well as PLR reduction method 600 as shown in FIG. 3A, depending on whether the PIE is sending or receiving packets.

In a block 602, egress PIE 20 receives a supplemental PLD packet 42 via the high QoS network path 40. In a block 604, egress PIE 20 receives service packets that were forwarded by ingress PIE 10 over low QoS network path 30, and, in a block 606, computes expected packet hashes based on a hash function and on all or any subset of the bytes, optionally packet meta-data, comprised in the corresponding service packet.

Note that the algorithm employed by egress PIE 20 to compute the packet hashes are expected to yield the same hash values as the computational method used by PIE 10 to compute packet hash values. Optionally, the same algorithm is used by PIEs 10 and 20.

In a block 608, egress PIE 20 compares a first count of packet hashes it has computed from the received service packets with a second count of packet hashes encoded in supplemental PLD packet 42 received in block 602. If there are more hash values in the supplemental PLD packet than packets received, then PIE 20 determines that a packet or packets were lost. In addition, the difference between the first count and second count indicates the number of lost packets. In addition, the identity of the lost packet(s) can be determined by comparing the packet hashes in the PLD packet to hashes computed for received packets.

In a block 610, egress PIE 20 takes an action to recover the lost service packet. In the present embodiment the recovery action for the lost service packet comprises egress PIE 20 sending a retransmission request back to ingress PIE 10 requesting ingress PIE 10 to retransmit the lost service packet. The retransmission request optionally comprises lost packet hashes that were included in the supplemental PLD packet but not included in the set of packet hashes computed from the service packets. Optionally, the retransmission request is transmitted over the high QoS network path, in order to advantageously minimize the delay in obtaining the lost service packet(s). In a block 612, egress PIE 20 receives the lost service packets retransmitted from ingress PIE 10. Optionally, the retransmitted lost service packets are sent over the high QoS network path in order to advantageously minimize the delay in obtaining the lost service packet(s).

Optionally, in a block 614, all service packets, both those received by PEI 20 without incident, and those received via retransmission, are forwarded to destination end-user. In cases where high QoS network path 40 is characterized by sufficiently lower delay than low QoS path 30, supplemental PLD packet 42 that is sent over high QoS network path 40 would typically arrive before all of the service packets 32, upon which supplemental PLD packet is based, arrives at egress PIE 20. Optionally, egress PIE 20 forwards all service packets successfully received unpostponed, resulting in packet misordering that needs to be handled by the destination end-user. Alternatively, the egress PIE may temporarily store packets successfully received after a lost packet, reorder them and forward them in the correct order, as originally transmitted by ingress PIE 10. Optionally, egress PIE 20 reorders the service packets responsive to an order of the packet hashes in the supplemental PLD packet. Optionally, egress PIE 20 reorders the service packets responsive to sequence numbers in the supplemental PLD packet.

Figure 3B:
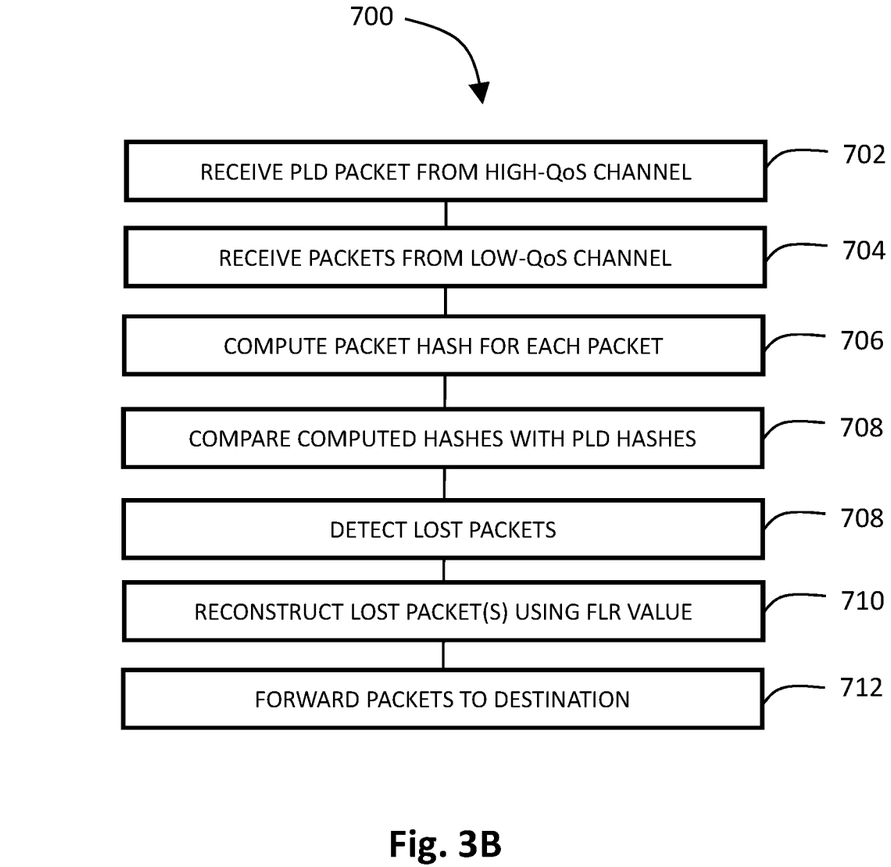
FIG. 3B shows a flow diagram of an alternative egress PLR reduction method as performed by an egress PIE in accordance with another embodiment of the disclosure.

FIG. 3A depicts a flow diagram 700 of an alternative egress PLR reduction procedure as performed by egress PIE 20, in accordance with an embodiment of the disclosure. Blocks 702 through 708 and 712 are analogous to blocks 602 through 608 and 614, respectively, as shown in FIG. 3A. Optionally, by way of example in embodiments disclosed herein with respect to flow diagram 700, the PLD packet comprises forward loss recovery (FLR) information in addition to packet hashes corresponding to the service packets sent by ingress PIE 10. Optionally, the FLR information comprises packet lengths and Forward Error Correction erasure code field respectively for each service packet. In a block 710 the recovery action comprises egress PIE 20 reconstructing the lost service packet based on information comprised in the received service packets and the FLR information in the PLD packet. By way of example, a single lost service packet may be recovered in egress PIE 20 by xoring the received packets with the FLR field. Any other erasure code known in the art may be used, such as fountain codes.

Figure 4A:
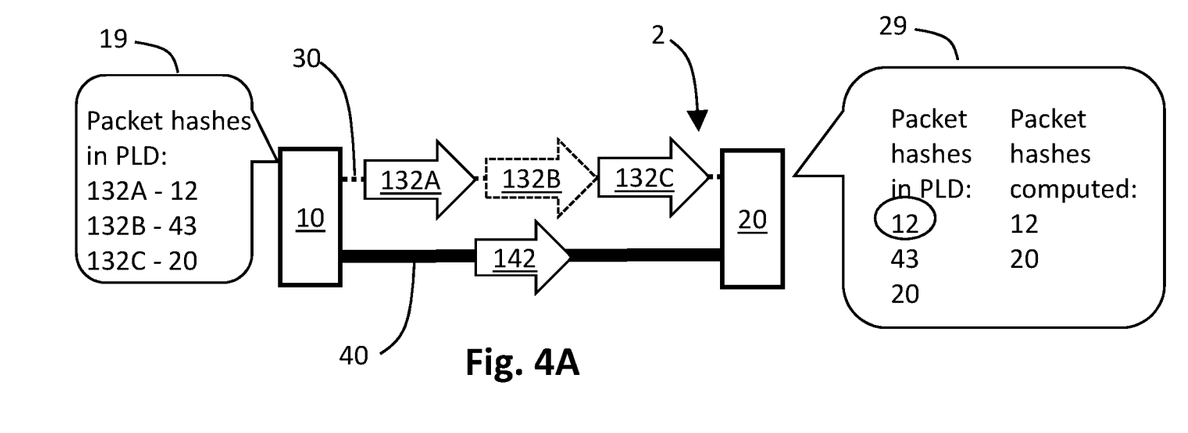
FIGS. 4A-4C schematically show a PLR reduction system comprising a pair of PIEs performing a PLR reduction method in accordance with an embodiment of the disclosure.
Figure 4B:
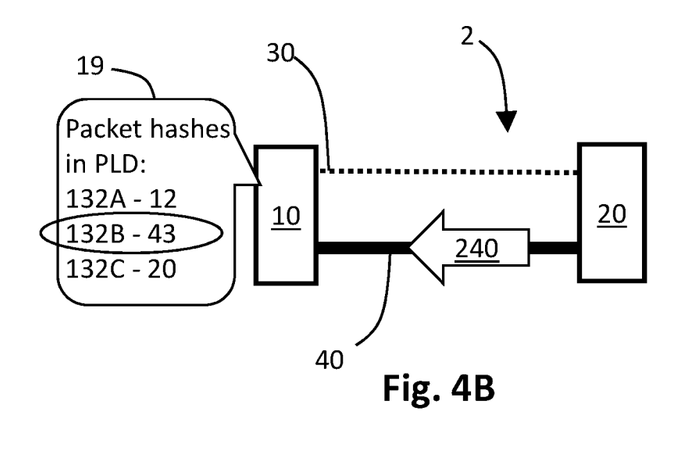
Figure 4C:
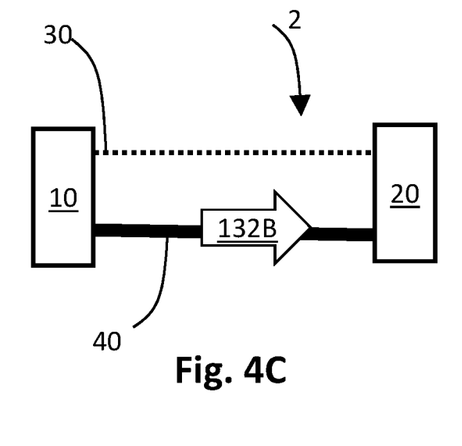

In an egress PLR method 600, 700, egress PIE 20 may forward all packets successfully received unpostponed, resulting in packet misordering that needs to be handled by the destination end-user. Alternatively, the egress PIE may immediately forward packets received until a packet loss is detected, and release the rest in correct order once the lost packet has been recovered. Alternatively the egress PIE may release all packets protected by the PLD after the entire sequence has been received. The packets may be reordered to the same order as originally transmitted by ingress PIE 10, as described above with respect to block 614 of method 600. Reference is made to FIGS. 4A-4C, which schematically show, by way of example, PIE 10 and PIE 20 during different phases during performance of a PLR reduction method in accordance with an embodiment of the disclosure.

In the present example, three service packets, 132A, 132B, and 132C are forwarded over low QoS path 30. These three packets are protected by PLD packet 142 sent over high QoS path 40, and which comprises three packet hashes (12, 43, and 20, respectively). We assume that service packet 132B is lost in transit and never reaches egress PIE 20. FIG. 4A also indicates results of computational processes executed by ingress PIE 10 as caption box 19, and results of computational processes executed by egress PIE 20 as caption box 29. Egress PIE 20 extracts hashes (12, 43, and 20) from the supplemental PLD packet, receives packets 132A and 132C and computes their hashes (12 and 20, respectively). PIE 20 deduces that packet 132B (with hash 43) has been lost and requests its retransmission by sending retransmission request packet 242 comprising hash 43 over high QoS path 40. Ingress PIE 10 determines the lost service packet 132B corresponding to hash 43, retrieves this packet from memory 102, and retransmits service packet 132B to egress PIE 20 over high QoS path 40.

Advantageously, an ingress PIE in accordance with an embodiment of the disclosure is capable of initially sending all service packets over a low QoS path without preemptively determining which service packets are to be sent through a low-QoS path and which are to be sent through a high-QoS path.

Advantageously, an ingress PIE in accordance with an embodiment of the disclosure is capable of sending a single copy of a service packet over a low QoS path, and only sending a second copy if a retransmission request for a lost packet is received from an egress PIE that performed packet loss detection.

Advantageously, an ingress PIE in accordance with an embodiment of the disclosure is capable of sending service packets over the low QoS path without modification of the service packets, by way of example by insertion of tunnel headers.

It should be noted that the amount of traffic sent over high QoS path 40 depends on the PLR of low QoS path 30. If the PLR of the low QoS path were to be zero, then the high QoS path would only transport supplemental PLD packets. Conversely, a PLR of the low QoS path of 100% would additionally result in all service packets being sent over the high QoS path.

Figure 5A:
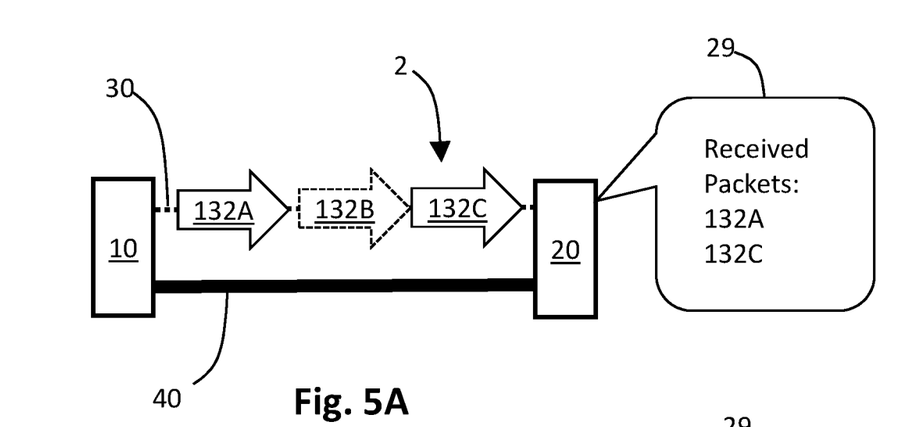
FIGS. 5A-5B schematically show a PLR reduction system comprising a pair of PIEs performing an alternative PLR reduction method in accordance with an embodiment of the disclosure.
Figure 5B:
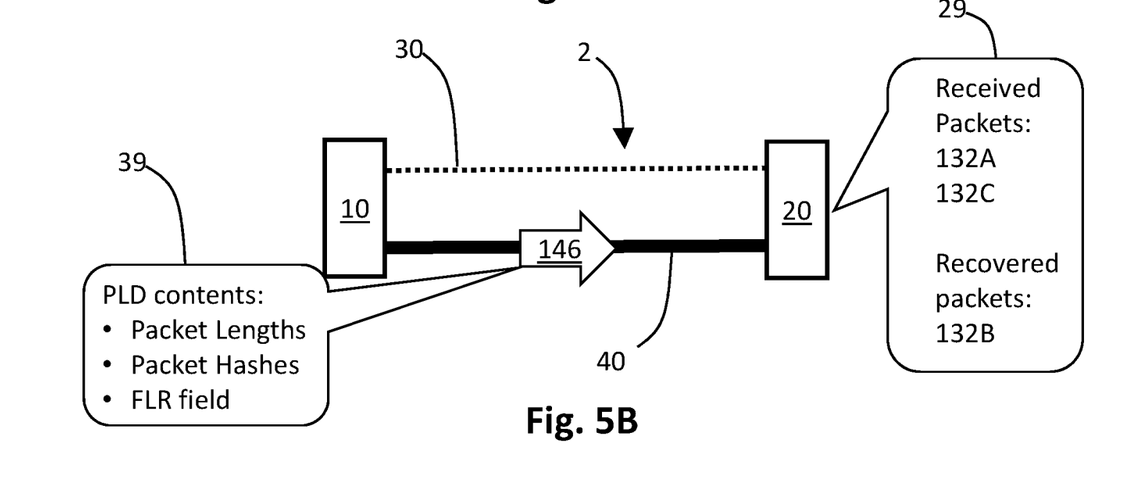

Reference is made to FIGS. 5A-5B, which schematically show, by way of example, PIE 10 and PIE 20 during different phases during performance of a PLR reduction method in accordance with another embodiment of the disclosure. As with the example above, service packet 132B in a set of service packets 132A, 132B, 132C forwarded by ingress PIE 10 is lost and never reaches egress PIE 20. In the present example, egress PIE 20 is able to recover the lost packet responsive to the packet length and FLR field of the lost packet, which was provided by a supplemental PR packet received from ingress PIE 10 via CG path 40.

As shown in FIG. 5A, egress PIE only receives service packets 132A and 132C. FIG. 5B shows supplemental PR packet 146 being transmitted from the ingress PIE via high QoS network path 40 and received by egress PIE 20. As schematically indicated in caption box 39, PR packet 146 comprises, in order of transmission, the packet lengths of each of packets 132A, 132B, and 132C, packet hashes, as well as an FLR field, which can be used by PIE 20 to recover lost packet 132B. Upon receipt of PLD packet 146 from high QoS path 40, the egress PIE checks the packets received on the low QoS path. The loss of packet 132B is detected and recovered responsive to the received service packets and information comprised in the FLR field. By way of example, the FLR field in PLD packet 146 comprises an FEC erasure code field comprising a xor of all packets 132A, 132B and 132C (padded to the length of the largest packet), and the single lost packet, 132B, is recovered in egress PIE 20 by xoring the received packets 132A and 132C with the FEC erasure code field and constraining to the length of lost packet 132B.

Advantageously, in a case where the propagation latency of the high QoS network path is sufficiently lower than that of the low QoS path, supplemental PLD packet 146 will arrive before the last of the service packets it protects, and the egress PIE will be able to detect and recover the lost packet as soon as the last service packet of the set of service packets is received.

There is therefore provided in accordance with an embodiment of the disclosure an ingress PLE reduction method for reducing packet loss ratio during network communications between an ingress node and an egress node, the method comprising the following actions by the ingress node: receiving a plurality of service packets from a source; storing the plurality of service packets in a memory; computing a plurality of packet hash values, each packet hash value computed from a corresponding service packet from the plurality of service packets; forwarding the plurality of service packets over a first network path; generating a supplemental packet comprising the plurality of hash values; and sending the supplemental packet over a second network path.

Optionally, the first network path has a lower QoS than the second network path. Optionally, the first network path is a best-effort path and the second network path is a carrier-grade communications path.

Optionally, said packet hash values are computed by a mathematical procedure resulting in a high probability for uniqueness. Optionally, said packet hash values comprise sequence numbers encoded in the respective service packets. Optionally, the packet hashes are encoded in the supplemental packet in an order by which the corresponding service packets were transmitted from the ingress packet. Optionally, the packet hashes respectively comprise sequence numbers corresponding to the order of transmission from the ingress packet.

In an embodiment of the disclosure, the supplemental packet further comprises a forward packet recovery (FLR) field.

There is also provided in accordance with an embedment of the disclosure an egress PLR reduction method for reducing packet loss ratio during network communications between an ingress node and an egress node, the method comprising the following actions by the egress node: receiving a supplemental packet over a second network path; extracting a plurality of packet hashes from the supplemental packet; receiving a plurality of service packets over the first network path; computing a plurality of packet hash values, each hash value computed from a corresponding service packet received over the first network path; comparing the plurality of computed packet hash values with the plurality of extracted packet hash values; determining a packet hash present in the plurality of extracted hash values but not present in the plurality of computed hash values as corresponding to a lost service packet that was transmitted by the ingress node but not received by the egress node; recovering the lost service packet; and forwarding the plurality of service packets and the recovered service packet to the destination.

In an embodiment of the disclosure, recovering the lost service packet comprises: transmitting to the ingress node a request for retransmission for the lost service packet; and receiving retransmitted lost service packet.

In an embodiment of the disclosure, the supplemental packet comprises a forward packet recovery (FLR) value and recovering the lost service packet comprises: reconstructing the lost service packet responsive to the plurality of service packets received over the first network path, the extracted packet hash values, and the FLR value; and forwarding the plurality of service packets and the recovered service packet to the destination.

Optionally, first network path has a lower QoS than the second network path. Optionally, the first network path is provided by a best-effort communications service and the second network path is provided by a carrier-grade communications service.

Optionally, the hash values are computed by a mathematical procedure resulting in a high probability for uniqueness.

In an embodiment of the disclosure, the egress method comprises, prior to forwarding, reordering the plurality of service packets and the recovered service packet in an order of transmission from the ingress packet, responsive to the extracted packet hashes. Optionally, the packet hashes are encoded in the supplemental packet in an order by which the corresponding service packets were transmitted from the ingress packet. Optionally, packet hashes respectively comprise sequence numbers corresponding to the order of transmission from the ingress packet.

There is also provided in an embodiment of the disclosure an apparatus operable as an ingress PIE to transmit packets to an egress node through a communications network, the apparatus comprising: a memory; a processor; a first network port configured to forward service packets over a first network path; a second network port configured to send data packets over a second network path; a set of instructions stored in the memory and executable by the processor to instruct the apparatus to perform an ingress PLR reduction method in accordance with an embodiment of the disclosure.

There is also provided in an embodiment of the disclosure an apparatus operable as an egress PIE to receive packets from an ingress node through a communications network, the apparatus comprising: a memory; a processor; a first network port configured to receive service packets over a first network path; a second network port configured to receive and send arbitrary data packets over a second network path; a set of instructions stored in the memory and executable by the processor to instruct the apparatus to perform an egress PLR reduction method in accordance with an embodiment of the disclosure.

There is also provided in an embodiment of the disclosure an apparatus that is operable both as an ingress PIE and as an egress PIE.

There is also provided in an embodiment of the disclosure a PLR reduction system comprising two or more of an apparatus in accordance with an embodiment of the disclosure, wherein: (1) at least one apparatus is operable as an ingress PIE and at least one other apparatus is operable as an egress PIE; or (2) at least one apparatus is operable both as an ingress PIE and as an egress PIE.

Descriptions of embodiments are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A method for reducing packet loss ratio during network communications between an ingress node and an egress node, the method comprising the following actions by the ingress node:
   receiving a plurality of service packets from a source;
   storing the plurality of service packets in a memory;
   computing a plurality of packet hash values, each packet hash value computed from a corresponding service packet from the plurality of service packets;
   forwarding the plurality of service packets over a best effort path to the egress node;
   generating a supplemental packet comprising the plurality of hash values; and
   sending the supplemental packet over a carrier-grade communications path to the egress node
   wherein the supplemental packet comprises a forward packet recovery (FLR) field.

2. The method according to claim 1, wherein said packet hash values are computed by a mathematical procedure resulting in a high probability for uniqueness.

3. The method according to claim 1, wherein said packet hash values comprise sequence numbers encoded in the respective service packets.

4. The method according to claim 3, wherein the packet hashes are encoded in the supplemental packet in an order by which the corresponding service packets were transmitted from the ingress node.

5. The method according to claim 3, wherein the packet hashes respectively comprise sequence numbers corresponding to an order of transmission of the service packets as sent from the ingress node.

6. A method for reducing packet loss ratio during network communications between an ingress node and an egress node, the method comprising the following actions by the egress node:
   receiving from the ingress node a supplemental packet comprising a plurality of hash values over a second network path;
   extracting the plurality of packet hashes from the supplemental packet;
   receiving from the ingress node a plurality of service packets over a first network path;
   computing a plurality of packet hash values, each hash value computed from a corresponding service packet received over the first network path;
   comparing the plurality of computed packet hash values with the plurality of extracted packet hash values;
   determining a packet hash present in the plurality of extracted hash values but not present in the plurality of computed hash values as corresponding to a lost service packet that was transmitted by the ingress node but not received by the egress node;
   recovering the lost service packet; and
   forwarding the plurality of service packets and the recovered service packet to a destination,
   wherein in the first network path is a best-effort path and the second network path is a carrier-grade communications path.

7. The method according to claim 6, wherein recovering the lost service packet comprises:
   transmitting to the ingress node a request for retransmission for the lost service packet; and
   receiving retransmitted lost service packet.

8. The method according to claim 6, wherein the supplemental packet comprises a forward packet recovery (FLR) value and recovering the lost service packet comprises:
   reconstructing the lost service packet responsive to the plurality of service packets received over the first network path, the extracted packet hash values, and the FLR value; and
   forwarding the plurality of service packets and the recovered service packet to the destination.

9. The method according to claim 6, wherein said packet hash values are computed by a mathematical procedure resulting in a high probability for uniqueness.

10. The method according to claim 6, wherein the method comprises, prior to forwarding, reordering the plurality of service packets and the recovered service packet to match an order of transmission of the service packets as sent from the ingress node, responsive to the extracted packet hashes.

11. The method according to claim 10, wherein the packet hashes are encoded in the supplemental packet in an order by which the corresponding service packets were transmitted from the ingress node.

12. The method according to claim 10, wherein the packet hashes respectively comprise sequence numbers corresponding to the order of transmission of the service packets as sent from the ingress node.

13. An apparatus operable as an ingress node to transmit packets to an egress node through a communications network, the apparatus comprising:
   a memory;
   a processor;
   a first network port configured to forward service packets over a best effort path;
   a second network port configured to send data packets over a carrier grade path;
   a set of instructions stored in the memory and executable by the processor to instruct the apparatus to perform the method according to claim 1.

14. An apparatus operable as an egress node to receive packets from an ingress node through a communications network, the apparatus comprising:
   a memory;
   a processor;
   a first network port configured to receive service packets over a best effort path;
   a second network port configured to receive and send arbitrary data packets over a carrier-grade communications path;
   a set of instructions stored in the memory and executable by the processor to instruct the apparatus to perform the method according to claim 6.

15. A method for reducing packet loss ratio during network communications between an ingress node and an egress node, the method comprising the following actions by the ingress node:
   receiving a plurality of service packets from a source;
   storing the plurality of service packets in a memory;
   computing a plurality of packet hash values, each packet hash value computed from a corresponding service packet from the plurality of service packets;
   forwarding the plurality of service packets over a best effort path to the egress node;
   generating a supplemental packet comprising the plurality of hash values;
   sending the supplemental packet over a carrier-grade communications path to the egress node;

receiving from the egress node a request for retransmission for one of the plurality of service packets determined by the egress node to be a lost packet; and retransmitting the lost packet to the egress node responsive to the request.

16. The method according to claim 15, wherein said packet hash values are computed by a mathematical procedure resulting in a high probability for uniqueness.

17. The method according to claim 15, wherein said packet hash values comprise sequence numbers encoded in the respective service packets.

18. The method according to claim 17, wherein the packet hashes are encoded in the supplemental packet in an order by which the corresponding service packets were transmitted from the ingress node.

19. The method according to claim 15, wherein the lost packet is retransmitted over the carrier-grade communications path.

20. An apparatus operable as an ingress node to transmit packets to an egress node through a communications network, the apparatus comprising:
- a memory;
- a processor;
- a first network port configured to forward service packets over a best effort path;
- a second network port configured to send data packets over a carrier-grade communications path;
- a set of instructions stored in the memory and executable by the processor to instruct the apparatus to perform the method according to claim 15.

* * * * *